Inventor
Logan T. Wood
By Frank E. Livrance Jr.
Attorney.

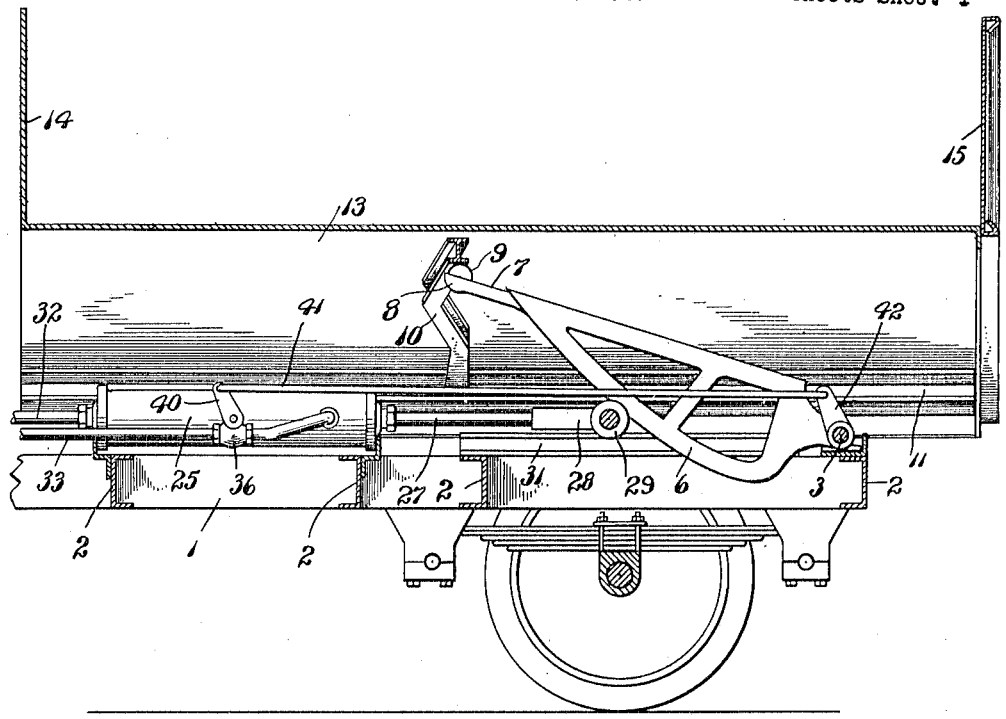

Patented Sept. 6, 1927.

1,641,365

UNITED STATES PATENT OFFICE.

LOGAN T. WOOD, OF DETROIT, MICHIGAN.

HOIST DEVICE FOR DUMPING BODIES.

Application filed March 14, 1927, Serial No. 175,119, and in France November 2, 1926.

This invention relates to hydraulic hoisting apparatus for dumping the contents of bodies mounted upon trucks or similar vehicles, and is particularly concerned with improvements for automatically controlling the hydraulically operated piston which moves to the rear during a dumping operation of the body so that the piston is controlled in its movements and moved to the rear only the necessary amount for a prescribed tilting of the body.

In my application for patent filed of even date, I have shown a construction whereby the contents of the body may not only be dumped by tilting the body about a horizontal axis at the rear end transverse of the frame of the truck on which the body is mounted, but it also may be dumped by tilting the body about either one or two axes located one at each side of the truck frame and parallel to the length thereof. The same hydraulic apparatus is utilized for effecting any of the dumping operation but it is not operated as far for a side dumping operation as it is when the contents of the body are dumped to the rear. A cylinder with a piston therein is utilized as a part of the power apparatus and a liquid pumped into the cylinder so as to move the piston to the rear with a consequent tilting of the body about a selected axis of tilting. In the present invention it is a primary object and purpose to provide an automatic mechanism which through the turning of the body for a rear dumping of its contents automatically renders it possible and necessary to force the piston farther to the rear than when side dumping of the body contents occurs; while if the selection of the dumping is on one side of the vehicle, the hydraulic control apparatus remains in its normal position wherein the piston will only move a part of the total distance that it can move to the rear. Thus no attention is paid to the control inasmuch as the selection of the character of dumping which is to be performed automatically takes care of this feature. For an understanding of the invention whereby this is attained, reference may be had to the following description taken in connection with the accompanying drawings, in which, Fig. 1 is a fragmentary vertical section taken longitudinally through a truck with a body mounted thereon, the same being equipped with my invention and with the body tilted for side dumping of its contents.

Fig. 2 is a similar section showing the body tilted to dump its contents at the rear of the truck.

Figure 4:
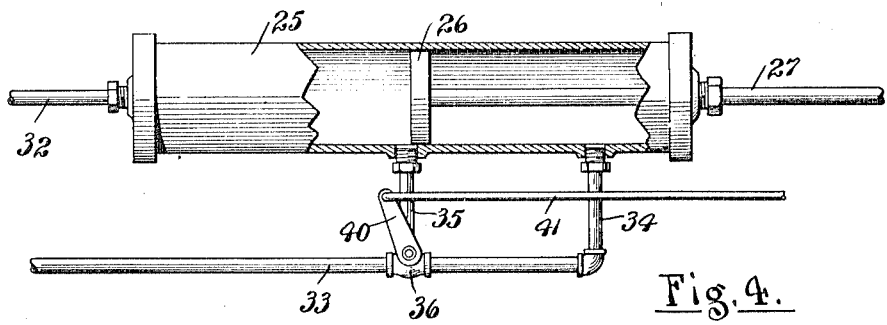
Figure 5:
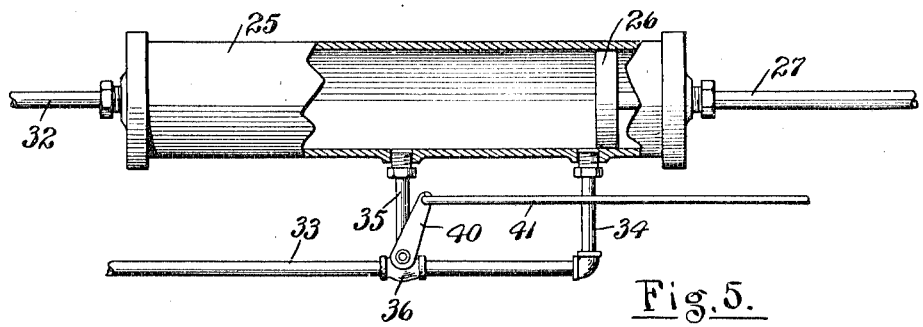
Figure 6:
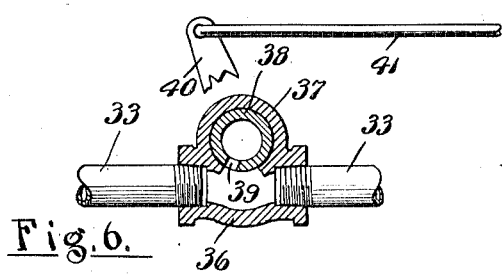

Figs. 4 and 5 are elevations, with parts in section, illustrating the hydraulic cylinder and piston used and the return pipes with the control mechanism associated therewith, that in Fig. 4 showing the normal position and the one that it maintains during side dumping, and Fig. 5 showing it as it is changed during the rear dumping, and Fig. 6 is a fragmentary enlarged detail in section illustrative of the valve mechanism for controlling the stroke of the piston.

Like reference characters refer to like parts in the different figures of the drawings.

Figure 3:
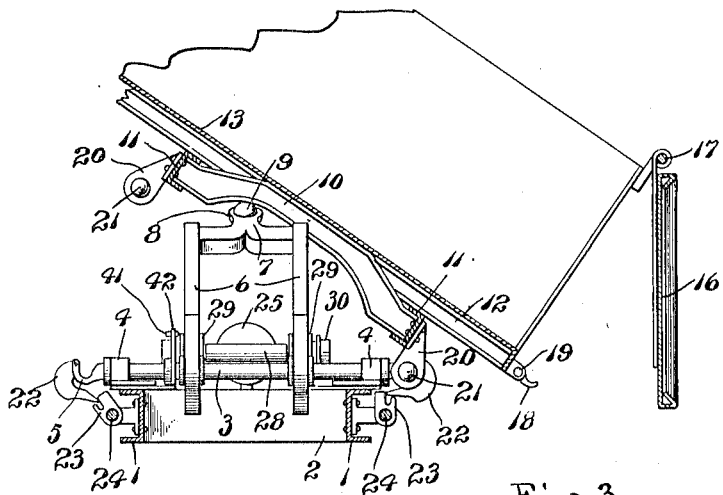
Fig. 3 is a fragmentary vertical section taken transversely through the truck frame and the body mounted thereon and with the body tilted for side dumping.

The truck frame is of well known construction having chassis side frame members 1 connected by cross members 2. At the rear end of the frame and transversely thereof is a rod or shaft 3 loosely mounted in suitable bearings 4 so that it may turn about its horizontal axis. At each end of the rod or shaft 3, outside of the bearings, a shallow U-shaped socket 5 is formed as shown in Fig. 3.

Two cam members 6 are mounted at their rear ends on the rod or shaft 3 so that they may turn loosely thereon and extend forward, each at its under side having an upwardly and forwardly inclined and curved surface. Said cam members are connected at their front ends by a cross bar 7 which has a forward extension at its middle terminating at its front end in a cup 8 in which a ball 9 is seated. This ball is directly under the lower cam surface of a cam cross rail 10 lying between and secured at its ends to two spaced apart channel members 11 which lie above and in parallel relation to the chassis side members 1 of the truck frame. The channel members 11 are attached at the under side of and support a plurality of cross sills 12 on which the body of the truck is mounted and secured.

The body of the truck, made chiefly of heavy sheet metal, has a bottom 13 a front end 14, the usual pivoted tail gate 15 and two sides 16 each of which is pivotally suspended at its upper edge on a horizontal rod 17 extending between the front and rear ends of the body. Each of the sides 16 is held in closed position by latching fingers 18 mounted on a rock shaft 19 one of which is carried by the truck at each side adjacent its lower edge. The method of latching or unlatching the sides of the body is fully set forth in my application for patent referred to.

The body, together with the cross sills 12 and the channel members 11, is supported in the sockets 5 at the ends of the rod or shaft 3 at its rear end, and in similar sockets (not shown) fixed to the frame of the vehicle near the front of the body. Brackets 20 fixed to the channel members 11 carry bearing pins 21 which seat in said sockets. These pins may be locked in the sockets by latch members 22 which are controlled in their movements by operating members 23 on rock shafts 24 one at the outer side of each of the chassis frame members 1. The manner of operating the latches 22 is also fully described in my other application for patent referred to. It is enough to say that for dumping the contents of the body at its rear end the front latches associated with the front sockets are moved to inoperative position but the rear latches associated with the rear sockets remain in locked position. While for dumping the body contents at a selected side of the truck, the latches at that side remain in locked position and those at the opposite side are unlocked.

A cylinder 25 is mounted horizontally on the cross members 2 of the truck frame below the body and in front of the cam members 6. Within the cylinder is a piston 26 connected to a piston rod 27 which extends through the rear head of the cylinder and at its rear end is equipped with a cross head 28 on which two pairs of rollers 29 and 30 are mounted. The first rollers bear against the under edges of the cam members 6 while the other rollers 30 bear upon rails 31 attached to the truck frame parallel to the length thereof.

It is obvious that any rear movement of the piston 26 results in an upward tilting of cam members 6 about the axis of the rod or shaft 3. If the front bearing pins 21 are unlocked from their sockets, the body is tilted upwardly about the axis of the shaft 3 and because of the engagement of the pins 21 with the sockets 5, shaft 3 is turned about its axis. If on the other hand the pins 21 at one side of the body are unlocked while those at the opposite side remain locked, the cam members 6 are elevated and the body is tilted to one side, as shown in Fig. 3, but the shaft 3 does not turn at all inasmuch, as shown in Fig. 2, one of the pins 21 is seated in the socket 5 at the right hand end of shaft 3 and holds it from any turning movement.

In order to move the piston 26 to the rear liquid is pumped into the cylinder 25 at the front through a pipe 32. The liquid back of the piston 26 is forced out of the cylinder and to the pump which is used, being carried by return pipe 33 connected with the cylinder by two spaced apart branch pipes 34 and 35 the last of which is commonly denoted as a by-pass pipe. When there is a free communication of the by-pass pipe 35 with the return pipe 33, the piston 26 will move to the rear only a point beyond where the by-pass pipe connects with the cylinder, or to the position shown in Fig. 4. This for the reason that as soon as the end of the by-pass pipe is uncovered the liquid will circulate from the cylinder through the pipe 35 and back to the pump through the return pipe 33. If on the other hand the by-pass pipe 35 is closed then the piston will move rearwardly until it passes by the point where the pipe 34 communicates with the cylinder.

When the body is in lower position the communication from the cylinder to the return pipe 33 through the by-pass 35 is open. A valve casing 36 is used as a combination valve casing and coupling for the sections of the return pipe and the by-pass pipe. At one side thereof is an enlargement 37 in which a valve 38 is rotatably mounted. The valve is hollow and has direct communication with the pipe 35. It has an opening 39 through one side for the passage of the liquid to the return pipe 33 when said opening is so positioned that it is not covered by the wall of the valve casing 37. The normal position of the valve 38, when the body is in lower horizontal position, is that shown in Fig. 6. Arm 40 is connected to the valve 38 to the outer end of which one end of a connecting rod 41 is attached, the same extending to the rear and having attachment at its rear end to the outer end of an arm 42 which is fixed to the rod or shaft 3 previously described.

Inasmuch as the rod or shaft 3 does not turn at all when side dumping of the contents of the body occurs the position of the valve 38 is not changed and there is free passage of the liquid in the hydraulic system through the pipe 35 to the return pipe 33 so that piston 36 moves to the rear only a part of the length of the cylinder 35 or to the position shown in Fig. 4. When this position is reached the cam members 6 will not be further elevated but will stay in its partially elevated position so long as the pump is operated. If, however, the body is tilted so as to dump its contents at its rear end, the rod or shaft 3 is turned moving the arm 42 to the rear end, as a consequence, moving arm 40 and rotating the valve 38 so that the passage 39 through the valve is closed. The piston in such case will be forced to the rear until it passes by the communicating end of the pipe 34 as shown in Fig. 5, and the cam members 6 will be elevated to a much steeper position or that shown in Fig. 3 as compared with that shown in Fig. 1.

The construction described is very simple and effective for attaining the desired objects of the invention. It is durable, practical and efficient, requires no attention and is fully automatic in its operation. The invention is defined in the appended claims and is to be considered comprehensive of all forms of structure coming within their scope.

I claim:

1. In combination, a truck frame, a body located above said truck frame and tiltable about three axes, one located transversely and at the rear of the frame and the others located one at each side of and parallel to the length of said frame, means mounted on the frame engaging against the body to tilt the same in any selected direction of tilting, and means for limiting the extent of operation of said tilting means when the body is to be tilted about either side axis and automatically increasing the extent of operation of said tilting means when said body is to be tilted about the rear transverse axis.

2. In combination, a truck frame, a body located above the frame, a horizontal shaft mounted at the rear and transversely of said frame, said body at its rear end being carried by said shaft and said body being tiltable for rear dumping of its contents about the axis of said shaft, said body being also tiltable about two other axes one at each side of and parallel to the length of the frame, cam members loosely mounted on said shaft and extending forward therefrom, said members at their front having operative engagement with the body to tilt the same about a selected axis of tilting, a horizontal cylinder located in front of the cam members, a piston therein, a piston rod extending rearwardly from the piston back of said cylinder, means carried by the rear end of said piston rod engaging with the cam members to elevate the same on rearward movement of the piston, means for normally limiting the rearward movement of the piston in the cylinder to a part of the length of said cylinder, and means carried by said shaft and operated thereby when the body is tilted for rear dumping to render said piston travel limiting means ineffective whereby the piston will move farther to the rear in said cylinder.

3. In combination, a truck frame, a horizontal shaft mounted on said frame at the rear and transversely thereof, said shaft having a socket at each end, a body carried by the frame and supported at its rear end in said sockets, said body being tiltable to dump its contents at the rear end thereof about the axis of said shaft and being also tiltable to dump its contents at either side turning in said sockets, hydraulic means for tilting the body about a selected axis of tilting, and means attached to the shaft and operated thereby for automatically controlling the extent of operation of said hydraulic tilting means, said shaft turning about its axis on tilting the body for rear dumping and remaining stationary when the body is tilted to either side for side dumping of its contents.

4. In combination, a truck frame, a shaft rotatably mounted on and located transversely of said frame at its rear end, a socket formed at each end of the shaft, a body located above and supported on said truck frame and provided with bearing pins received in said sockets, means for locking said pins in the sockets, means for selectively freeing either of said bearing pins in its socket to thereby select the direction in which the body is to tilt, hydraulic means for tilting the body in a selected direction, means normally limiting the extent to which said hydraulic means are operated, and means attached to said shaft and operated thereby as the shaft turns when the body is tilted for a rear dumping of its contents, to render said controlling means inoperative and cause the hydraulic tilting means to operate to a greater extent.

5. In combination, a truck frame, a horizontal shaft rotatably mounted at the rear end and transversely of said frame, said shaft having a socket at each end thereof, a body mounted on the frame and supported thereby and by said sockets, bearing pins on the body received in said sockets, latching means for locking the bearing pins in the sockets, means for selectively releasing said latching means, cam members loosely mounted on the shaft and extending forward therefrom, means interposed between the front ends of the cam members and the bottom of the body for tilting the body on upward turning of the cam members about said shaft, a horizontal cylinder, a piston therein, a piston rod extending from the piston through the rear end of the cylinder, tracks carried by the frame, a cross head at the rear end of the piston rod, rollers thereon riding on said tracks, other rollers on the cross head bearing against the under edges of said cam members, a pipe for conducting liquid under pressure against the front side of the piston, a second pipe connected to the piston adjacent its rear end for returning liquid back of the piston to the pressure means, a by-pass pipe connecting the return pipe and the cylinder at a point intermediate the ends of said cylinder, a valve disposed between the by-pass pipe and the return pipe normally in open position, and means connecting the valve with said shaft so as to turn the valve to closed position on tilting movement of the body about the axis of said shaft.

6. A construction containing the elements in combination defined in claim 5, said last mentioned means comprising an arm extending from the valve, a second arm extending from the shaft and a connecting rod connecting the outer ends of said arms.

7. In combination, a truck frame, a body mounted thereon to tilt about three axes, one located horizontally at the rear and transversely of said frame and the others located one at each side and parallel to the length of said frame, means for selecting the axis about which the body shall be tilted, hydraulic means for tilting the body about a selected axis including a horizontal cylinder, a piston movable lengthwise thereof, means connected to said piston co-operating with means bearing against the body for tilting the body, a pipe through which liquid may be pumped into the front end of the cylinder for forcing the piston rearwardly, a second pipe connected with the cylinder adjacent its rear end for returning liquid back of said piston to the pump, a by-pass pipe connecting the cylinder substantially midway between its ends with said return pipe, a valve disposed in said by-pass pipe normally in open position and limiting the extent of movement of said piston to the rear in remaining in open position on tilting of said body to one side, and means operating to automatically close said valve on tilting the body about said rear horizontal axis whereby the piston will move farther back and the hydraulic means operate to a greater extent on tilting the body about the rear horizontal axis.

In testimony whereof I affix my signature.

LOGAN T. WOOD.